United States Patent
De Guerre et al.

(10) Patent No.: US 10,885,105 B2
(45) Date of Patent: Jan. 5, 2021

(54) IMAGE SEARCH BASED ON MESSAGE HISTORY

(71) Applicant: Apple Inc., Cupertino, CA (US)

(72) Inventors: James De Guerre, Oakland, CA (US); Vipul Ved Prakash, San Francisco, CA (US); Vojtech Jina, Santa Clara, CA (US); Yogish Baliga, Fremont, CA (US); Ashwin Kashyap, San Jose, CA (US); David Salim, Milpitas, CA (US); Bryan Hansen, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 185 days.

(21) Appl. No.: 15/380,912

(22) Filed: Dec. 15, 2016

(65) Prior Publication Data

US 2018/0173725 A1 Jun. 21, 2018

(51) Int. Cl.
*G06F 16/00* (2019.01)
*G06F 16/58* (2019.01)
*H04L 12/58* (2006.01)

(52) U.S. Cl.
CPC ........ *G06F 16/5866* (2019.01); *H04L 51/046* (2013.01); *H04L 51/10* (2013.01)

(58) Field of Classification Search
CPC .............. G06Q 50/01; G06Q 30/0256; G06Q 30/0255; G06Q 30/0254; G06F 17/30991; G06F 3/04842; G06F 17/30867
See application file for complete search history.

(56) References Cited

U.S. PATENT DOCUMENTS

| | | | | |
|---|---|---|---|---|
| 7,509,384 | B1* | 3/2009 | Chen | H04L 51/04 709/204 |
| 7,890,876 | B1* | 2/2011 | Mandelbaum | G06F 16/58 715/758 |
| 2004/0168055 | A1* | 8/2004 | Lord | H04L 63/0823 713/156 |
| 2005/0021624 | A1* | 1/2005 | Herf | H04L 12/1822 709/204 |
| 2007/0168448 | A1* | 7/2007 | Garbow | H04L 12/1831 709/207 |
| 2007/0271340 | A1* | 11/2007 | Goodman | G06Q 10/107 709/206 |

(Continued)

*Primary Examiner* — Augustine K. Obisesan
(74) *Attorney, Agent, or Firm* — Womble Bond Dickinson (US) LLP

(57) ABSTRACT

Systems and methods are disclosed for suggesting expressive graphical content to a user to share within a messaging system. Expressive graphical content can include images, video, animated images, any of which may include sound, that a message system user is likely to share because it is related to a conversation between one or more users of the message system. Expressive graphical content may be content that is recent, humorous, and/or popular or trending in popularity, and can be shared without a copyright. A transcript of a message session between two or more users of a message system can be used to generate keywords for identifying and prioritizing expressive graphical content. The keywords can be prioritized and used as search terms to proactively suggest to the user to search for expressive graphical content. A search can be initiated automatically upon selecting one or more of the keywords.

22 Claims, 9 Drawing Sheets

(56) References Cited

U.S. PATENT DOCUMENTS

| | | | | |
|---|---|---|---|---|
| 2007/0300169 | A1* | 12/2007 | Jones | G06F 17/211 |
| | | | | 715/764 |
| 2008/0141146 | A1* | 6/2008 | Jones | G06Q 10/107 |
| | | | | 715/753 |
| 2008/0300872 | A1* | 12/2008 | Basu | G10L 15/26 |
| | | | | 704/235 |
| 2009/0043848 | A1* | 2/2009 | Kordun | H04L 12/1831 |
| | | | | 709/205 |
| 2009/0292526 | A1* | 11/2009 | Harari | G06F 17/2765 |
| | | | | 704/9 |
| 2009/0319516 | A1* | 12/2009 | Igelman | G06Q 30/02 |
| 2010/0011080 | A1* | 1/2010 | Kordun | H04L 12/1831 |
| | | | | 709/206 |
| 2011/0320273 | A1* | 12/2011 | Miranda-Steiner | G06Q 30/02 |
| | | | | 705/14.49 |
| 2012/0020465 | A1* | 1/2012 | Davies | G10L 15/22 |
| | | | | 379/88.01 |
| 2012/0023113 | A1* | 1/2012 | Ferren | G06F 17/30867 |
| | | | | 707/751 |
| 2012/0290947 | A1* | 11/2012 | Baggett | G06F 3/04847 |
| | | | | 715/752 |
| 2012/0296920 | A1* | 11/2012 | Sahni | H04L 67/22 |
| | | | | 707/749 |
| 2015/0095354 | A1* | 4/2015 | Miller | G06F 16/335 |
| | | | | 707/754 |
| 2015/0178388 | A1* | 6/2015 | Winnemoeller | H04L 12/1827 |
| | | | | 707/722 |
| 2017/0048170 | A1* | 2/2017 | Smullen | H04L 67/02 |

* cited by examiner

IMAGE SEARCH BASED ON MESSAGE HISTORY

TECHNICAL FIELD

This disclosure relates to the field of presenting images to a message client for sharing in a messaging system.

BACKGROUND

A user of messaging system may share an image, video, or graphic (collectively, "image") that is related to a topic between users during a message conversation or "chat" session. Finding an image to share that is related to the subject of a message conversation can be difficult to do, especially on a portable electronic device such as a smart phone. Typing search text, sifting through image search results, and selecting an image to share are all time consuming tasks requiring a lot of detailed interaction with the portable electronic device. Some message clients facilitate searching for images with an add-in software, such as Google® GBoard®, which provides a pop-up search box within the message client. The search box requires that the user type in a canonical search query, obtain the image search results, select from the image results, then select "paste" and select "share" to add the image to a message. The selected content is then sent in a message to a recipient. The add-in lets a user stay within an application to perform a search, but does not reduce typing, or utilize the already-typed and/or received content in the message conversation to reduce typing, prioritize results, or return more relevant or trending results based on the chat content. In addition, in a messaging system wherein the chat content is encrypted, a server cannot access the chat content to improve search results. In message systems wherein the message server can access chat content, the chat users will experience an associated loss of privacy.

SUMMARY OF THE DESCRIPTION

Systems and methods are disclosed for proactively suggesting expressive graphical content to a user, related to a message conversation ("chat"), to share within a messaging system. Expressive graphical content can include images, video, animated images, any of which may include sound. Expressive graphical content can include content that a user of a message system is likely to share because it is related to a conversation between one or more users of the message system. Expressive graphical content may be humorous content including video or animated imagery, content that is recent, and/or popular or trending in popularity. Expressive graphical content may also have a low byte count. Expressive graphical content can also be content for which copyright is not needed to share the content. Expressive graphical content can be prioritized before being presented to the user for selection and sharing. A transcript of all, or a portion, of a message session ("chat") between two or more users of a message system can be used to generate keywords for identifying and prioritizing expressive graphical content. The keywords can be prioritized and used as search terms to proactively suggested to the user to search for expressive graphical content. A search can be initiated upon selecting one or more of the keywords. Suggested expressive graphical content, and query results, can be filtered and prioritized based upon a set of criteria. Graphical content that is currently trending on social media, or has been shared a threshold number of times on a social media or messaging system can be prioritized higher than older, less shared, or unshared content.

In another embodiment, a search engine can be configured to collect, store, and process expressive graphical content. Expressive graphical content can be obtained from one or more image/video sources, from one or more message systems, and/or one or more social networks. In an embodiment, a search engine can receive a query from a user to search for expressive graphical content. The query can contain one or more keywords obtained from a transcript of a message conversation between a plurality of users of a message system. In an embodiment, query keywords can be synonyms for client transcript keywords. Synonym keywords can be obtained from an asset catalog on the client device. In an embodiment, search engine can periodically perform a job to collect updated expressive graphical content. Processing expressive graphical content can include extracting keywords from text and/or metadata associated with the expressive graphical content, ranking the expressive graphical content based on popularity and/or trending of the content, and storing the expressive graphical content and extracted keywords.

In an embodiment a non-transitory computer readable can store executable instructions, that when executed by a processing system, can perform any of the functionality described above.

In yet another embodiment, a processing system coupled to a memory programmed with executable instructions can, when the instructions are executed by the processing system, perform any of the functionality described above.

Some embodiments described herein can include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

Other features and advantages will be apparent from the accompanying drawings and from the detailed description.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Figure 1:
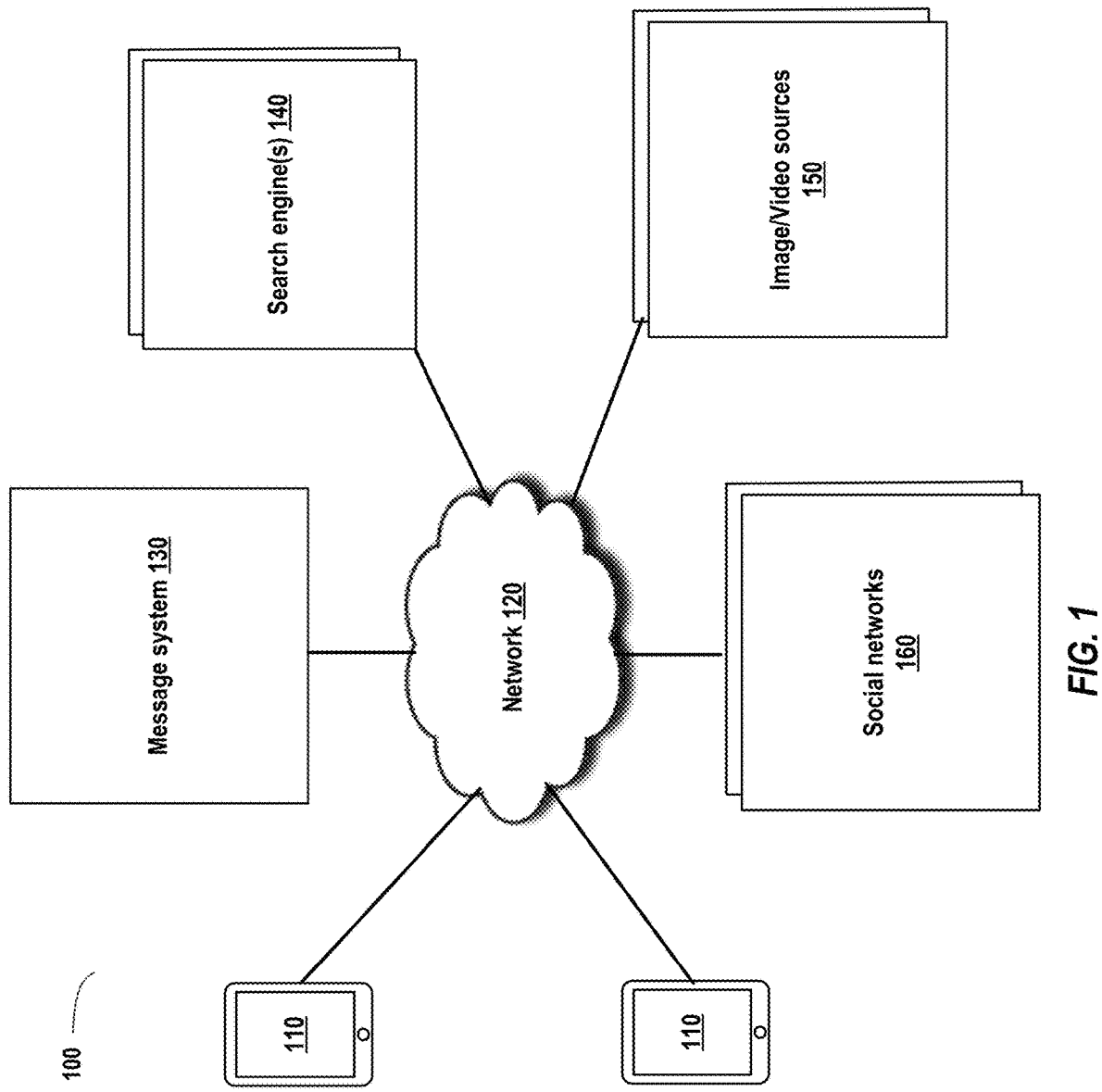
FIG. 1 illustrates, in block form, an overview of a system for sharing expressive graphical content, according to some embodiments.

FIG. 1 illustrates, in block form, an overview of a system 100 for sharing expressive graphical content, according to some embodiments.

A client device 110 can establish a message session ("chat") with another client device 110 via a message system 130. The client devices 110 and message system 130 can be coupled via a network 120. In a message session between client devices 110, one or more of the client devices 110 can share expressive graphical content in a message using a messaging application on the client device 110. The messaging application can proactively suggest to a user of a client device 110 expressive graphical content related to keywords obtained from a transcript of the message session and, optionally, from an asset catalog on the client device 110. The messaging application can also proactively suggest keywords to a user of the client device 110 for searching for expressive graphical content from within the message application. Expressive graphical content can include popular, recent, or trending content including images, animated images, video in a variety of formats, streaming video, and other graphical content. In an embodiment, expressive graphical content can include or incorporate audio content. A search screen in the messaging application can proactively suggest search terms to find expressive graphical content related to keywords obtained from the transcript of the message session and/or from an asset catalog. Additional keywords, and expressive graphical content, can be obtained from a search engine 140 in response to one or more search queries issued by the client device 110 to obtain expressive graphical content. Client devices 110 can comprise a portable electronic device, such as a smart phone, a desktop computer, such as an Apple® iMac®, a tablet computer, such as an Apple® iPad®, or other computing device 110 as described below with reference to FIG. 8.

Network 120 can be any type of network, such as Ethernet, Token Ring, Firewire, USB, Fibre Channel, or other network type.

Message system 130 can be any type of messaging system, such as a text message system, SMS message system, email message system, Apple® iMessage®, or Facebook® Messenger. Message system 130 can be implemented on one or more servers. An exemplary server is described below with reference to FIG. 8. Message system 130 can be coupled to client devices 110 via network 120. One or more client devices 110 can be engaged in a conversation having a topic. The conversation can be a session comprising a plurality of messages from one or more client devices 110.

Search engine 140 can be a general purpose search engine comprising a search or query engine, a search engine interface, and logic to process and return results to a client device 110 in response to a search query from the client device 110. In an embodiment, search engine 140 can be configured to search for expressive graphical content. Such configuration can include logic implementing one or more filters, search logic that identifies image/video sources 150 that store expressive graphical content that is shareable and is appropriate for messaging applications. Filters can include an adult content filter, filter based on file format, media length (duration), byte content, encoding type, humor, or current topics. Search engine 140 can include an application programming interface (API) that contains, or interfaces to, logic that processes graphical content. Search engine 140 can receive graphical content from one or more image/video content sources 150 via network 120 in response to a query or as pushed content from image/video sources 150. Search engine 140 can receive graphical content from one or more social networks 160 via network 120, in response to a query or as pushed content from social network(s) 160. In an embodiment, search engine 140 can receive graphical content that was shared via a social network 160. In an embodiment, social networks 160 can provide the search engine 140 with graphical content that has been the most-shared, or is trending or popular, on the social networks 160. Search engine 140 can be any type of server, such as described with reference to FIG. 8, below Image/video sources 150 can be websites that are known to source graphical content. In an embodiment, image/video sources 150 can include one or more filters that can be applied to graphical content before providing graphical content to search engine 140. Filters can include the same, or different filters than those implemented on search engine 140. Filters can include filtering out adult content, filtering out video that is longer than a predetermined duration of time, or larger than a predetermined byte count size, and filtering out content that originates in a specified country. Filtering can include filtering to include graphical content having one or more specified languages and/or filtering to exclude graphical content having one or more specified languages. Filtering can further include filtering out graphical content that requires a copyright to share the content, filtering in content that is humorous, filtering in (or out) graphical content of a specified file format. Filtering can further include filtering out content that is older than a predetermined period of time or date so that recent content is included and older content is excluded. Image/video sources 150 can be any type of servers, such as described with reference to FIG. 8, below.

Social networks 160 can provide graphical content, or references to graphical content, to search engine 140 via network 120. Social networks 160 can be implemented on any type of server, such as described below with reference to FIG. 8. A social network 160 may include its own message system 130 wherein graphical content is shared. Social networks 160 can include push-services such as Twitter®. Social networks 160 can provide popular, current, and/or trending graphical content to search engine(s) 140 that can be returned to a client device 110 in response to a query.

Figure 2:
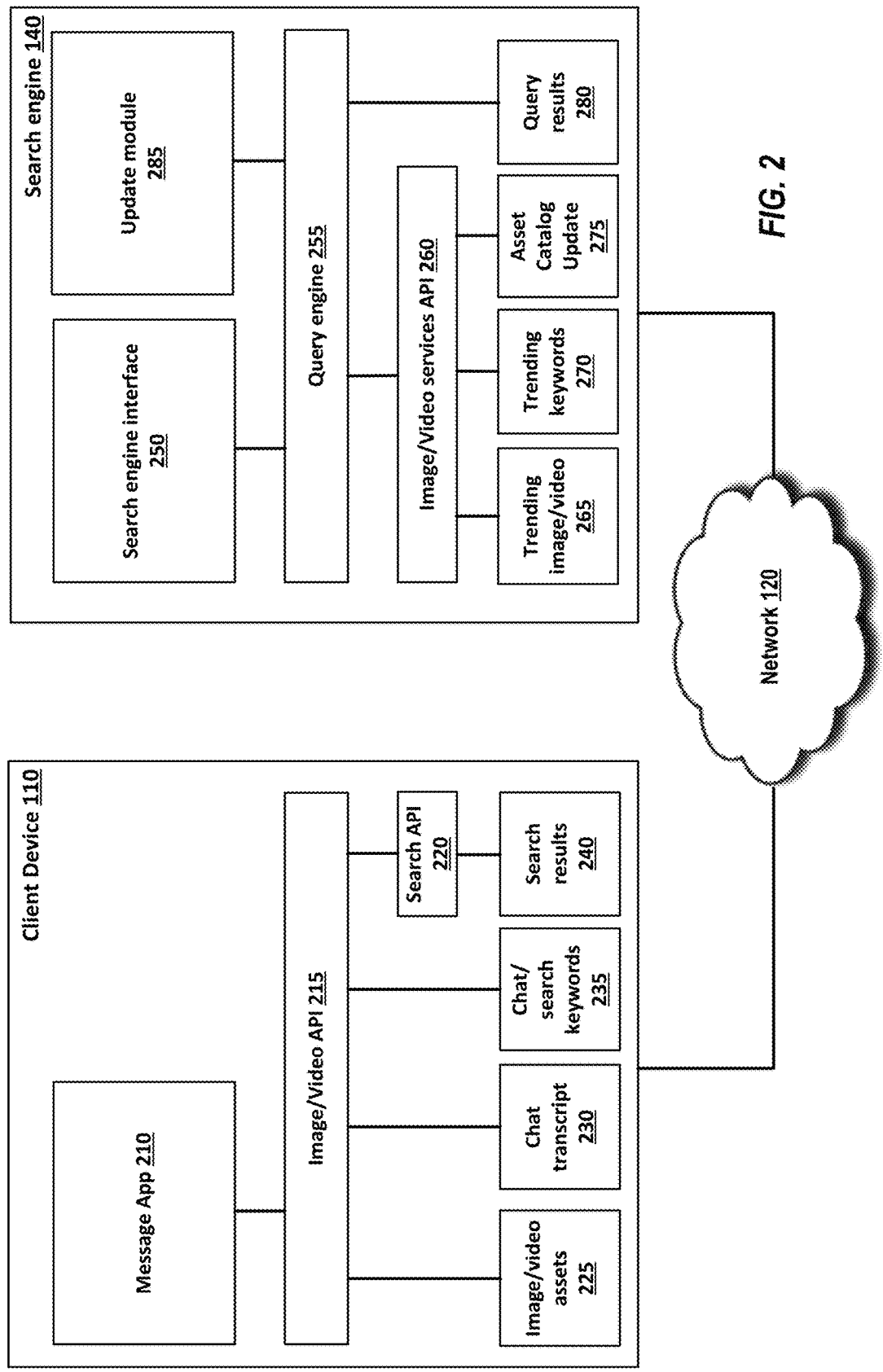
FIG. 2 illustrates, in block form, internal components of a system for sharing expressive graphical content, according to some embodiments.

FIG. 2 illustrates, in block form, internal components of a system 100 for sharing expressive graphical content within a message system environment, according to some embodiments.

Internal components of client device 110 can include a message application 210, such as Apple iMessage®, Facebook® Messenger, a text message application, an email application, or other message application. Message application can call one or more application programming interfaces (APIs) e.g. image/video API 215, that implement the client device 110 functionality described herein. In embodiment, image/video API 215 can include logic that generates a transcript of a message conversation ("chat") between a first client and one or more second clients. Image/video API 215 can further include logic to extract keywords from the transcript of a chat and use the keywords to identify images/graphics within image/video assets 225 and/or search results 240 related to a topic of the chat. Image/video API 215 can include logic to rank the image/video according to relevance to a topic of the message conversation, recency, whether or not the images/videos are trending, and/or are being shared on social media. In response a user selecting an "images" control on a user interface in message application 210, message application 210 can call logic in image/video API 215 that presents a plurality of the ranked images/videos to the user for selection and sharing in a message. In an embodiment, only a predetermined number of the ranked images/videos are presented to the user. In an embodiment, the number of images/videos displayed to the user can be dependent upon an amount of available display space for presenting the images/videos to the user. Images/video can be presented to the user in ranked order. In response to a user selecting an image/graphic from the presented images/video, the selected image/graphic can be automatically shared in a message. In an embodiment, sharing can include appending, embedding, or inserting the selected image/video into the message. In an embodiment, the image/video can shared automatically response to the selecting.

Image/video API 215 can be further include logic to obtain search keywords related to a topic of a message conversation between a first user and one or more second users. Message application 210 can call image/video API to obtain the search words for presentation to the user. Search keywords can be obtained from keywords of a chat transcript, keywords obtained from image/video assets 225 using one or more chat transcript keywords, or a combination of these. If a previous search has been performed using keywords obtained from a transcript of a message session, additional keywords can be obtained from the image/video search results, metadata and other words associated with the image/video search results, or a combination of these. In an embodiment, the search keywords can be presented to the user in response to a user selecting a "search" control from a user interface of message application 210.

Client device 110 can further include a search API 220 that performs search functionality for one or more applications on client device 110. In an embodiment, search API 220 can be configured or optimized for searching for expressive graphical content (images/videos, etc). Client device 110 can further include a plurality of storages including image/video assets 225, chat transcript 230, chat/search keywords 235, and search results 240.

Image/video assets 225 can include expressive graphical content, metadata associated with each piece of expressive graphical content, keywords associated with each piece of expressive graphical content, popularity, recency, and/or trending information about the expressive graphical content.

In an embodiment, image/video API 215, or search API 220, can use keywords from chat transcript 230 to find additional keywords and expressive graphical content within image/video assets 225 to present expressive graphical content and/or search keywords to a user of message application 210.

Chat transcript 230 can include a transcript of one or more messages between one or more users in a message conversation or "chat" session. In an embodiment, a chat transcript can contain all words in all messages between all users in the chat session. There can be multiple chat session transcripts stored in chat transcript storage 230. Each chat session transcript can correspond to a separate and distinct message conversation between a first user and one or more second users. In an embodiment, the chat transcript 230 can be maintained locally on a client device 110, and not transmitted to search engine 140.

Chat/search keywords 235 can include keywords from chat transcript 230 and keywords related to chat transcript keywords obtained from image/video assets 225 or search results 240. Image/video API 215 can include logic to use keywords from a chat transcript to find more chat/search keywords in image/video assets 225 that may be related to one or more chat transcript words. Image/video API 215 or search API 220 can group chat/search keywords into topics. In an embodiment, keywords can be filtered for popularity, trending, and recency, so that chat/search keywords are the most recent, popular, and/or trending keywords related to the chat transcript 230, as may be augmented by recent, popular, and/or trending keywords in the image/video assets 225 that are related to chat transcript 230 keywords. Chat/search keywords 235 can be ranked by relevance to a topic and presented to a user in response to the user selecting a "search" control in a user interface of message application 210.

In response to a user selecting one or more keywords for search, message application 210 can call search API 220 to issue a search query for expressive graphical content using the selected keyword(s). In an embodiment, the search query is issued automatically in response to selecting the keyword(s). Search engine 140 can return search results 240 from the search. Search results 240 can be received and stored for use by message application 210, image/video API 215, and search API 220. Search results 240 can include expressive graphical content and metadata and keywords associated with the expressive graphical content. Message application 210, image/video API 215, and/or search API 220 can be used to rank the expressive graphical content in the search results 240. Expressive graphical content can be ranked using by any/all of the relevance of the graphical content to keywords of the chat transcript, recency of the expressive graphical content, whether the expressive graphical content is trending, and how many times the expressive graphical content has been shared, such as on social media. Ranked expressive graphical content can be presented to the user of the message application 210 in response to the user selecting an "images" control within the message application 210. Image/video API 215 and/or search results API 220 can further extract additional keywords from metadata and other text that is associated with expressive graphical content returned in the search results 240.

Search engine 140 can include search engine interface 250, a query engine 255, image/video services API 260, update module 285, and a plurality of storages. The plurality of storages can include a trending, popular or recent image/video storage 265 ("trending image/video 265"), popular or trending keywords 270 ("trending keywords 270"), asset catalog update 275, and query results 280.

Search engine interface 250 can receive a search query for expressive graphical content from client device 110. Search engine interface 250 can provide search query results 280 to client device 110. In an embodiment, search engine interface 250 can also receive one or more queries from updated module 285 to query for the latest popular or trending expressive graphical content. Search engine interface 250 can contain logic that is specialized for processing of expressive graphical content. For example, search engine interface 250, or query engine 255, can include logic to search for particular file formats, media duration, or media byte content size. Search engine interface 250, or query engine 255, can comprise one or more pre- or post-query filters that optimize search results to find expressive graphical content that is well-suited to sharing via a message system. Expressive graphical content that is well-suited to sharing via a message system can be popular, trending, graphical content that is related to topics that are popular or trending, and that can easily be shared via messaging system. Content can easily be shared via a message system if that content does not require a copyright to share the content, the content is of a reasonably small size in terms of byte count or duration of playing time, so that a user of a message does not include large data charges.

Pre-query filters can include adding query criteria that implement a filter. Post-query filters can include filters that filter the results returned from a search query. Filters can be implemented using a combination of pre- and post-query filters. Filters can be implemented to include certain content, or exclude certain content. Filters can including filtering out adult content, filtering results by file format type (e.g. mp4, GIF, mpeg, etc.), filter by recency (e.g., content created with a predetermined time before the current date/time), filter by size of the content (e.g., filter out results great than 1 MB), filter out results that have a running time longer than a predetermined length (e.g. filter out video longer than 1 minute), filter content based upon whether it is trending, whether the content has been, e.g., one of the top ten shared content items on social media, filter in humorous content, or filter out content that requires a copyright to share the content.

Query engine 255 can receive a query and, optionally, pre-process a search query from search engine interface 250. Pre-processing can include parsing the query into keywords. Pre-processing can calling image/video services API 260 to use the query keywords to obtain additional keywords from trending keywords 270 and/or asset catalog update 275. As query engine 255 receives query results 280, query engine 255 can extract one or more keywords from one or more query results 280 to add to trending keywords and/or asset catalog update 275. Post-processing expressive graphical content results can include extracting keywords from metadata associated with the content, extracting text associated with the content, and parsing the graphical content to determine whether image/video content contains words within the image/video. Query engine 255 can also call image/video API 260 to add newly trending expressive graphical content to trending image/video 265. Query engine 255 can call image/video services API 260 to add keywords obtained from query results to trending keywords 270. Query engine 255 can return query results 280, as may be filtered or post-processed, to client device 110.

Trending image/video 265 can store expressive graphical content that is trending, is the most shared on social media or messaging systems, matches keywords of the most search queries, or is otherwise popular for sharing.

Trending keywords 270 can store keywords related to trending image/videos 265. Query engine 255 can call image/video services API 260 to generate trending keywords from queries received and query results. Query engine 255 can call image/video services API to extract keywords from metadata or other text associated with a query result, or by parsing the video/image query result to obtain text that may contain keywords associated with the vide/image query result.

Update module 285 can interface to search engine interface 250 and query engine 255 to search for expressive graphical content on the web, e.g. from image/video sources 150, social networks 160, and message systems 130, that can be used as expressive graphical content for sharing within a message system 130. In an embodiment, update module 285 can generate one or more queries to image/video sources 150 to obtain popular and trending expressive graphical content. Update module 285 can pass the queries to search engine query interface 250. Search engine interface 250 can pre-process the search query as described above for queries received from client devices 110. Search engine interface 250 can pass the query to query engine 255. Query engine 255 can pre-process the query as described above with respect to queries received from client devices 110. Query engine 255 can post-process query results 280 received in response to the query as described above for queries received from client devices 110. In an embodiment, search engine 140 can subscribe to one or more image/video sources 150 and/or social networks 160 and receive popular, trending, expressive graphical content via the subscription. In an embodiment, image/video sources 150 and/or social networks 160 can push popular, trending, expressive graphical content to search engine 140 based upon one or more subscriptions by search engine 140. In an embodiment, search engine 140 can poll image/video sources 150 and/or social networks 160 to receive popular, trending expressive video content. Whether by an update module 285 query or a subscription, in an embodiment, image/video sources 150 and/or social networks 160 can pre-process expressive graphical content before returning the content to search engine 140. Pre-processing can include and of the pre-processing features described above with reference to search engine 140. Update module 285 can post-process the content/query results returned from image/video sources 150 and/or social networks 160 to store trending image/video 265 and store new trending keywords 270. In an embodiment, update module 285 can run an update job to update asset catalog update 275 with trending image/video 265 and trending keywords 270 that have been added since a previous version of image/video assets 225 was distributed to one or more clients. In an embodiment, update module 285 can push an asset catalog update 275 to client devices 110. In an embodiment, update module 285 can return an updated asset catalog 275 to a requesting client device 110.

Figure 3A:
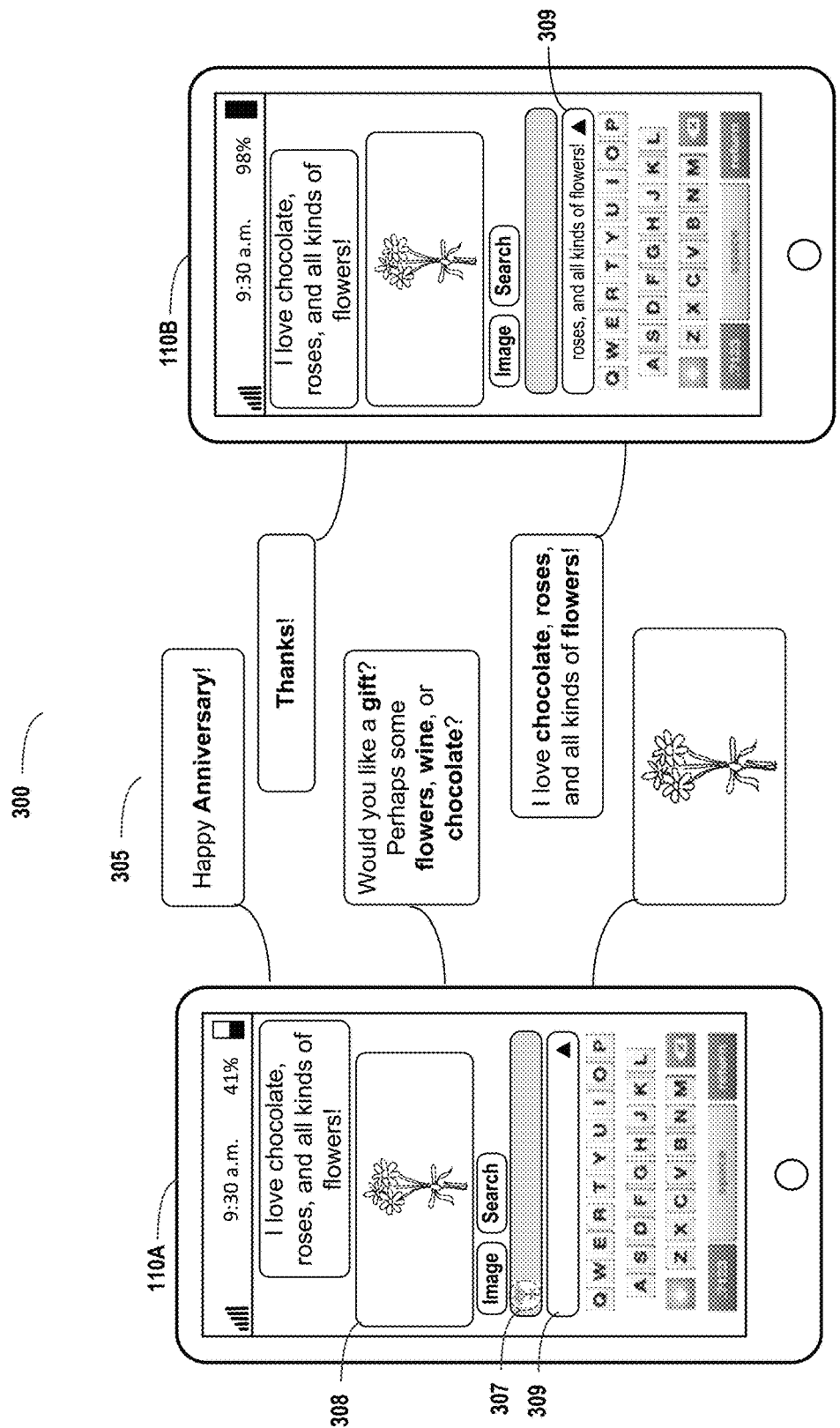
FIGS. 3A through 3C illustrate example displays of client device sharing expressive graphical content, according to some embodiments.
Figure 3C:
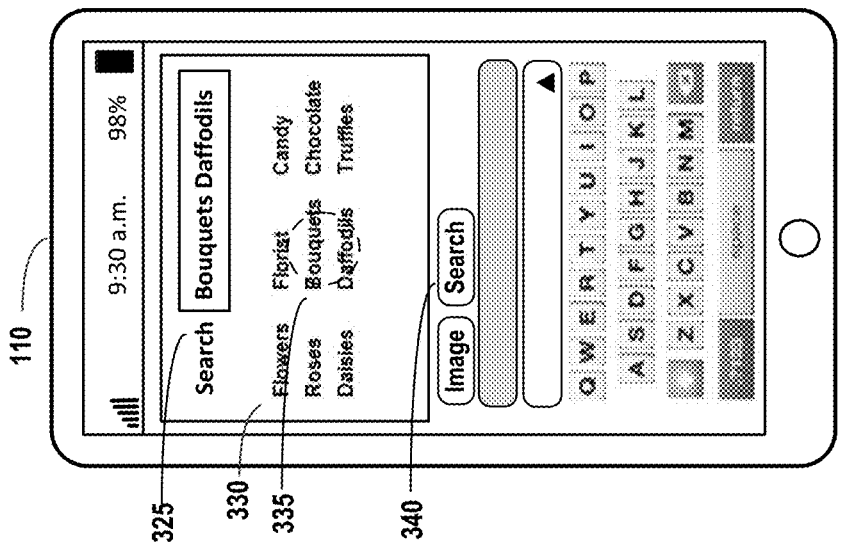
Figure 3B:
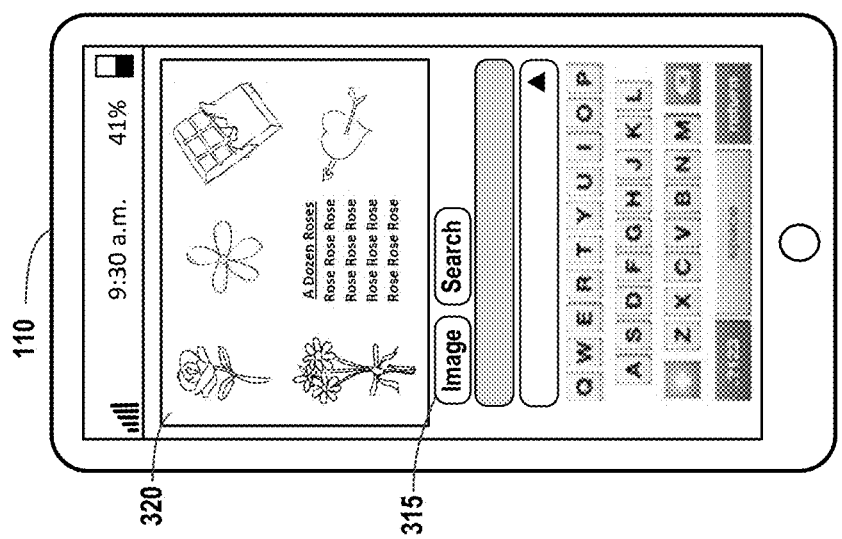

FIGS. 3A through 3C illustrate example displays of client device 110 sharing expressive graphical content, according to some embodiments. FIG. 3A illustrates a message conversation between two client devices 110A and 110B. FIG. 3B illustrates message application 210 proactively displaying expressive graphical content to a user that is related to the message conversation of FIG. 3A. FIG. 3C illustrates message application 210 proactively displaying to a user keywords related to expressive graphical content that is related to the message conversation of FIG. 3A. Functionality described for a client device 110 can be performed independently on each client device 110 that is a participant in the message conversation.

In FIG. 3A, client devices 110A and 110B are engaged in a message conversation ("chat") 305. The topic of the chat appears related to one recipient's anniversary. The tone of the conversation 305 is light and humorous. A transcript can be generated that includes the messages sent by client device 110A and the client device 110B. Both client devices 110A and 110B can each independently generate a transcript of the entire conversation between the two client devices 110A and 110B. Keywords can be extracted, by a client device 110, from the transcript. Example keywords extracted from the transcript could include: anniversary, thanks, gift, flowers, wine, chocolate, and roses. The keywords chocolate and flowers appear twice. The reference to the date (today) and the words anniversary, thanks, gift, flowers, wine, roses, and chocolate can be used to infer that the topic is a the giving of an anniversary gift by one participant to the other participant. The date of the anniversary, or the current date, can be used to determine whether expressive graphical content that may be shared in a message is recent, with respect to the date. The transcript further indicates that the users of client devices 110A and 110B are finding humor or pleasantry in the conversation. In a suggestion control 307, one or more expressive graphical content items may be displayed for selection by the user. Selection of a content item in the suggestion control 307 shares the content item in a text 308. In an embodiment, a content item is shared immediately in response to selection of the content item from suggestion control 307. In an embodiment, the content item is shared with text that has been typed within a text control, e.g. text control 309.

Given the keywords obtained from the transcript of FIG. 3A, additional keywords can be obtained by accessing image/video asset catalog 225. For example, the additional keywords "florist," "candy," and "bouquets" may be obtained from image/video asset catalog 225 using the transcript keywords "flowers," "chocolate," "roses," and "gift." In addition, or alternatively, a client device 110 can query a server, such as search engine 140, to obtained additional keywords related to the keywords extracted from the transcript of the conversation. In an embodiment, other than keywords contained in a search query, the keywords of the transcript of the conversation are not shared with a server. To preserve user privacy, the transcript of the conversation is not shared with a server.

In FIG. 3B, in response to a user activating a user interface control 315, e.g. an "Image" control, expressive graphical content can be displayed that was obtained from image/video assets 225. The expressive graphical content is related the keywords extracted from the transcript of the conversation and can further be related to additional keywords obtained from an image/video assets catalog 225 on the client device 110 (collectively, "keywords"). Such expressive graphical content can include, e.g., humorous images or GIFs related to the keywords, here images/video of anniversary gifts 320.

In FIG. 3C, in response to a user activating user interface control 340, e.g. a "Search" control, keywords 330 can be displayed as potential search terms to find additional/different expressive graphical content. In addition, a search box 325 can be presented to the user of message application 210 in the event that the user prefers to type in a search. In an embodiment, keywords can be grouped together in keywords 330 such that related keywords are adjacent to one another to facilitate multi-keywords selection with a single selection. For example, the keywords "bouquets" and "daffodils" can be adjacent to one another and can be selected as a pair of keywords with a single finger tip press 335. In an embodiment, a user of client device 110 can swipe one keyword to another keyword to select both keywords for search. In an embodiment, a user can simultaneously select a plurality of keywords with one or more keypresses within a predetermined selection window of time, e.g. 1 to 2 seconds of selecting a first keyword. Upon selection of the one or more keywords, and optionally the expiration of the predetermined selection window of time for multi-selections, the search can be automatically performed using the selected keywords. The search results can be displayed to the user of message application 210 as shown in FIG. 3C.

Figure 4:
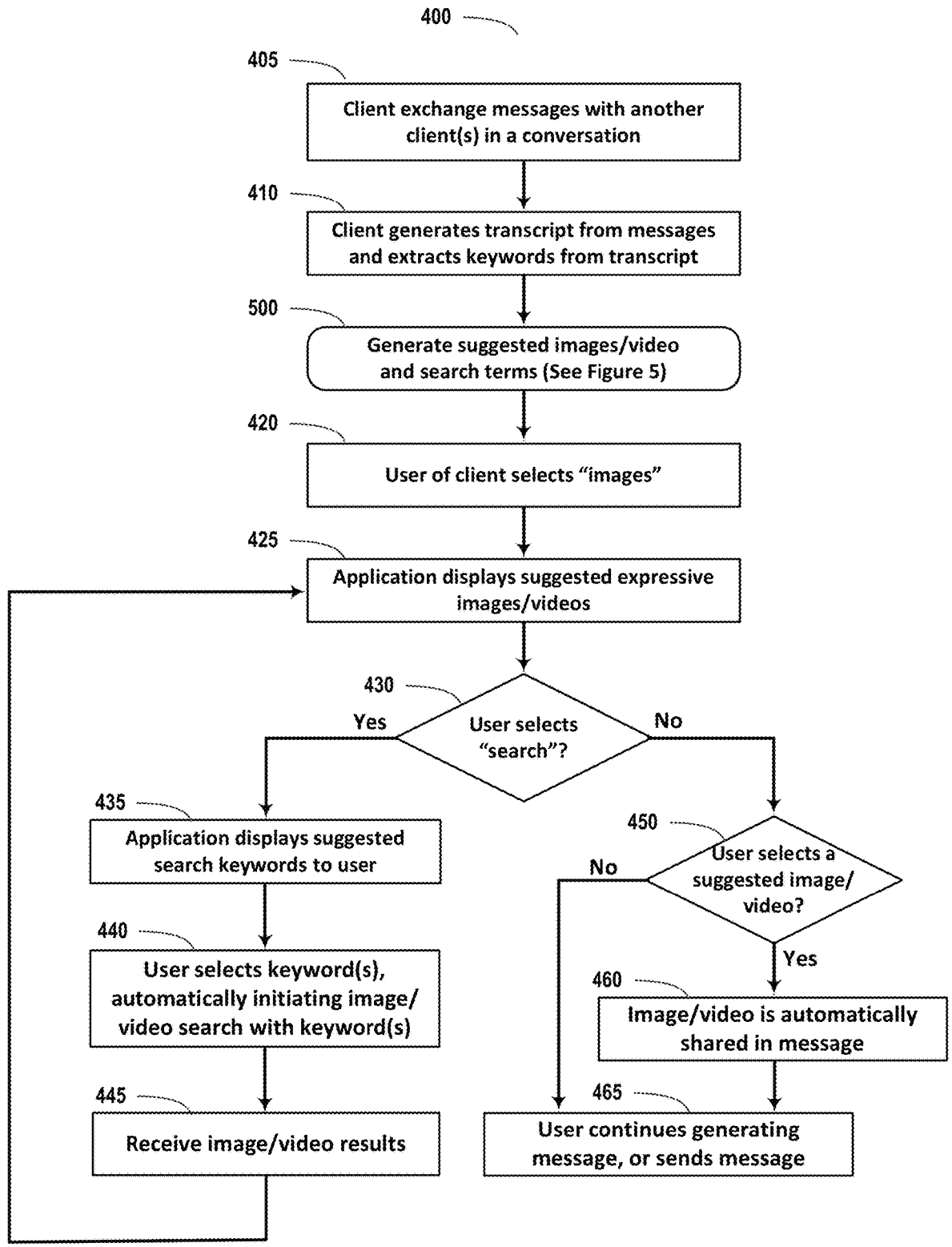
FIG. 4 illustrates a method of a client device searching, selecting, and sharing expressive graphical content, according to some embodiments.

FIG. 4 illustrates a method 400 of a client device 110 searching, selecting, and sharing expressive graphical content, according to some embodiments. The method 400 is described with reference to a message conversation between two or more client devices 110. Method 400 is described, below, with respect to a first client device 110. However, each of the client devices 110 in the message conversation can independently perform method 400 on the respective client device 110.

In operation 405, a first client device 110 can exchange messages with one or more second client devices ("another client device") 110. The combined messages by the first and second client devices 110 constitute a message conversation ("chat").

In operation 410, the first client device 110, e.g., can generate a transcript of the conversation from the messages of all client devices 110 in the conversation. The first client device 110 can also generate one or more keywords from the transcript.

In operation 500, the first client device 110 can use the keywords generated from the transcript to access image/video assets 225 to obtain expressive graphical content and additional keywords, related to the topic of the conversation. Operation 500 is described in further detail, below, with reference to FIG. 5.

In operation 420, a user of the first client device 110 can select an "image" control from a user interface of the message application 210.

In operation 425, in response to the user selecting the "image" control of the user interface, message application 210 can display a plurality of expressive graphical content items 320 to the user of the first client device 110. An example display is shown in FIG. 3B.

In operation 430, it can be determined whether the user has selected a "search" control from a user interface of the message application 210. If so, then method 400 continues at operation 435, otherwise the method 400 continues at operation 450.

In operation 435, message application 210 can display to the user of the first client device 110 suggested keywords to use for searching for expressive graphical content to share in a message. In an embodiment, the keywords to display can be a sub-set of the keywords generated in operations 410 and 500. In an embodiment, a search box 325 can also be displayed in the user interface of the message application, along with the keywords 330.

In operation 440, a user can select one or more keywords from the keywords displayed in operation 435. A user can alternatively enter one or more search terms into a search box provided on the message application 210 user interface. Entry of search terms can by typing, voice entry, or other entry functionality. An example of display of keywords (operation 435) and selection of keywords (operation 440) is shown in FIG. 3C. A search query for expressive graphical content can be initiated in response to the selection, or entry, of keywords.

In operation 445, first client device 110 can receive search results from search engine 140 in response to the search query. Method 400 continues at operation 425, wherein message application 210 displays suggested expressive graphical content items to the user for sharing in a message.

If, in operation 430, it was determined that the user did not select a "search" control from a user interface of message application 210, then in operation 450 it can be determined whether the user has selected a suggested expressive graphical content item from the display of expressive graphical content items 320 in operation 425. If so, then method 400 continues at operation 460, otherwise method 400 continues at operation 465.

In operation 460, the selected expressive graphical content item can be automatically shared in a message to be sent by first client device 110 to one or more of the second client devices 110 in the message conversation.

In operation 465, a user can continue generating the message, or can send the message.

Figure 5:
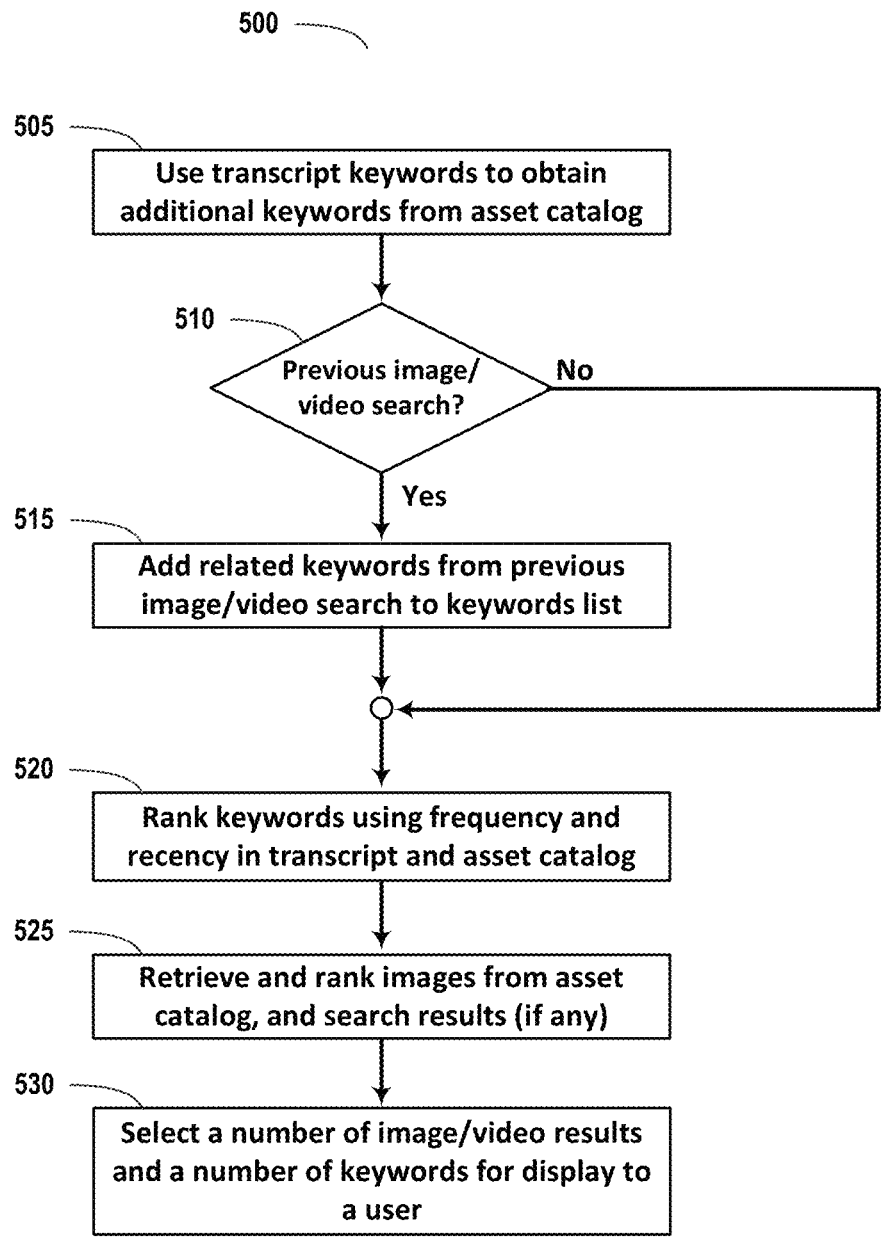
FIG. 5 illustrates a method of a client device prioritizing display of expressive graphical content for selection by a user of a client device, according to some embodiments.

FIG. 5 illustrates a method 500 of a client device 110 prioritizing display of expressive graphical content for selection by a user of the client device 110, according to some embodiments. Method 500 is described below with reference to first client device 110 in a message conversation with one or more second client devices 110. Method 500 can also be performed independently by any of second client devices 110.

In operation 505, first client device 110 can use transcript keywords to obtain additional keywords from image/video asset catalog 225. Keywords in image/video asset catalog 225 can be grouped or associated by a topic. One more transcript keywords can be matched to one or more topics. Additional keywords can be extracted from image/video asset catalog 225 based at least in part on a degree of matching between one or more transcript keywords and keywords of a topic in the image/video asset catalog 225.

In operation 510, it can be determined whether a previous search for expressive graphical content had been performed for this conversation by the first client device 110. If so, then method 500 continues at operation 515, otherwise method 500 continues at operation 520.

In operation 515, first client device 110 can add one or more keywords obtained from the previous search results to the transcript keywords and any keywords obtained from the image/video asset catalog 225.

In operation 520, message application 210 can rank all keywords, including transcript keywords, image/video asset catalog 225 keywords, and any keywords obtained from the results of a previous search for expressive graphical content, using the recency of expressive graphical content associated with the keywords, the number of times that expressive graphical content associated with the keywords has been shared in a message and/or by social media, and/or a trending rate of the expressive graphical content. In an embodiment, message application 210 can make one or more calls to Image/video API 215 to rank the keywords.

In operation 525, using the ranked keywords, message application 210 can retrieve and rank expressive graphical content associated with the ranked keywords. In an embodiment, message application 210 can perform the retrieval using one or more calls to image/video API 215 and/or search API 220. Expressive graphical content can be retrieved from image/video asset catalog 225 and/or search results 240 from any previous query for expressive graphical content for the conversation.

In operation 530, message application 210 select a predetermined number of expressive graphical content items to display to the user. In an embodiment, the predetermined number can be based upon an amount of available display space for the expressive graphical content items. In an embodiment, the predetermined number can be determined taking into account an image/video display resolution and whether the expressive video content can be reduced in size to make display space for more expressive graphical content items.

Figure 6:
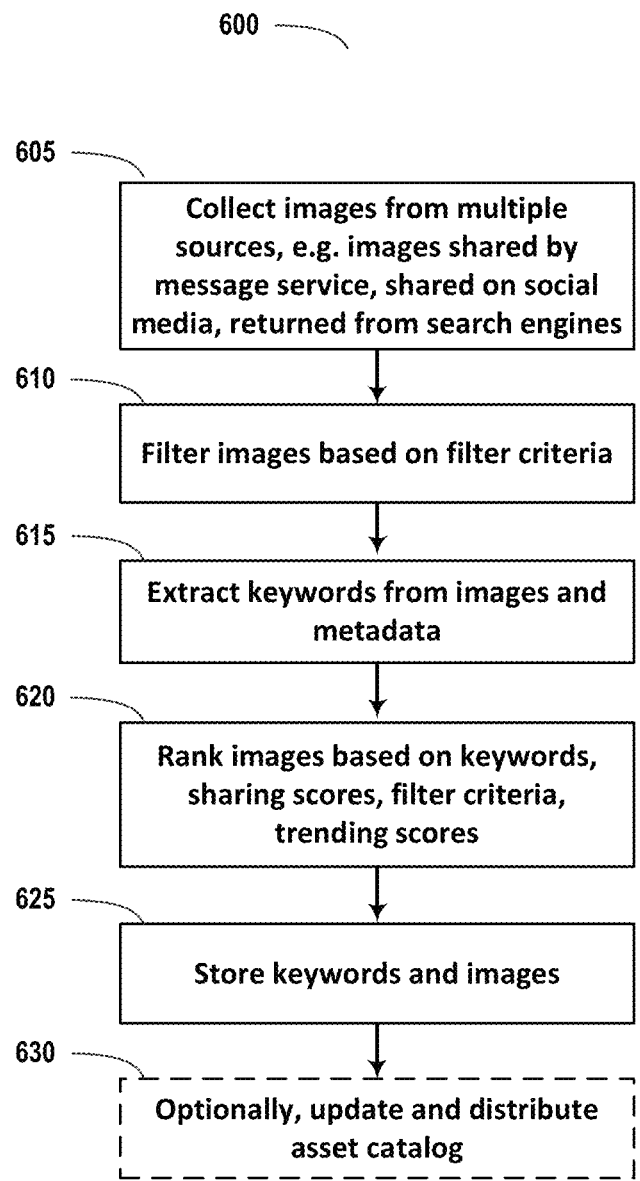
FIG. 6 illustrates a method of a server learning expressive graphical content, according to some embodiments.

FIG. 6 illustrates a method 600 of a search engine 140 learning expressive graphical content shared between client devices 110, according to some embodiments. In an embodiment, method 600 can be performed as a periodic job by search engine 140 update module 285.

In operation 605, search engine 140 can aggregate and process expressive graphical content from one or more of: expressive graphical content items shared by a message service 130, expressive graphical content items obtained from image/video sources 150, expressive graphical content shared via social media 160, and expressive graphical content items returned from user searches.

In operation 610, expressive graphical content can be filtered in accordance with one or more filters. Filters can include filtering out adult content, filtering out video that is longer than a predetermined duration of time or larger than a predetermined byte count size, and filtering out content that originates in a specified country. Filtering can include filtering to include graphical content having one or more specified languages and/or filtering to exclude graphical content having one or more specified languages. Filtering can further include filtering out graphical content that requires a copyright to share the content, filtering in content that is humorous, filtering in (or out) graphical content of a specified file format. Filtering can further include filtering out content that is older than a predetermined period of time or date so that recent content is included and older content is excluded.

In operation 615, search engine 140 can extract keywords from text and metadata associated with expressive graphical content items.

In operation 620, search engine 140 update module 285 can rank the expressive graphical content items in accordance with sharing scores, trending scores, popularity of keywords associated with the expressive graphical content, recency of the expressive graphical content, and other factors.

In operation 625, ranked images and keywords can be stored in trending image/video 265, trending keywords 270, asset catalog update 275, or other storage.

In operation 630, update module 285 can optionally update asset catalog update 275 with one or more of the expressive graphical content items obtained in method 600 that is not already contained within the asset catalog update 275. In an embodiment, only a predetermined number of new content items are added to asset catalog update 275. For example, in an embodiment, only a predetermined number of new content items per conversation topic are added to asset catalog update 275. Asset catalog update 275 can be pushed to one or more client devices 110. In an embodiment, asset catalog update 275 to be sent to one or more requesting client devices 110.

Figure 7:
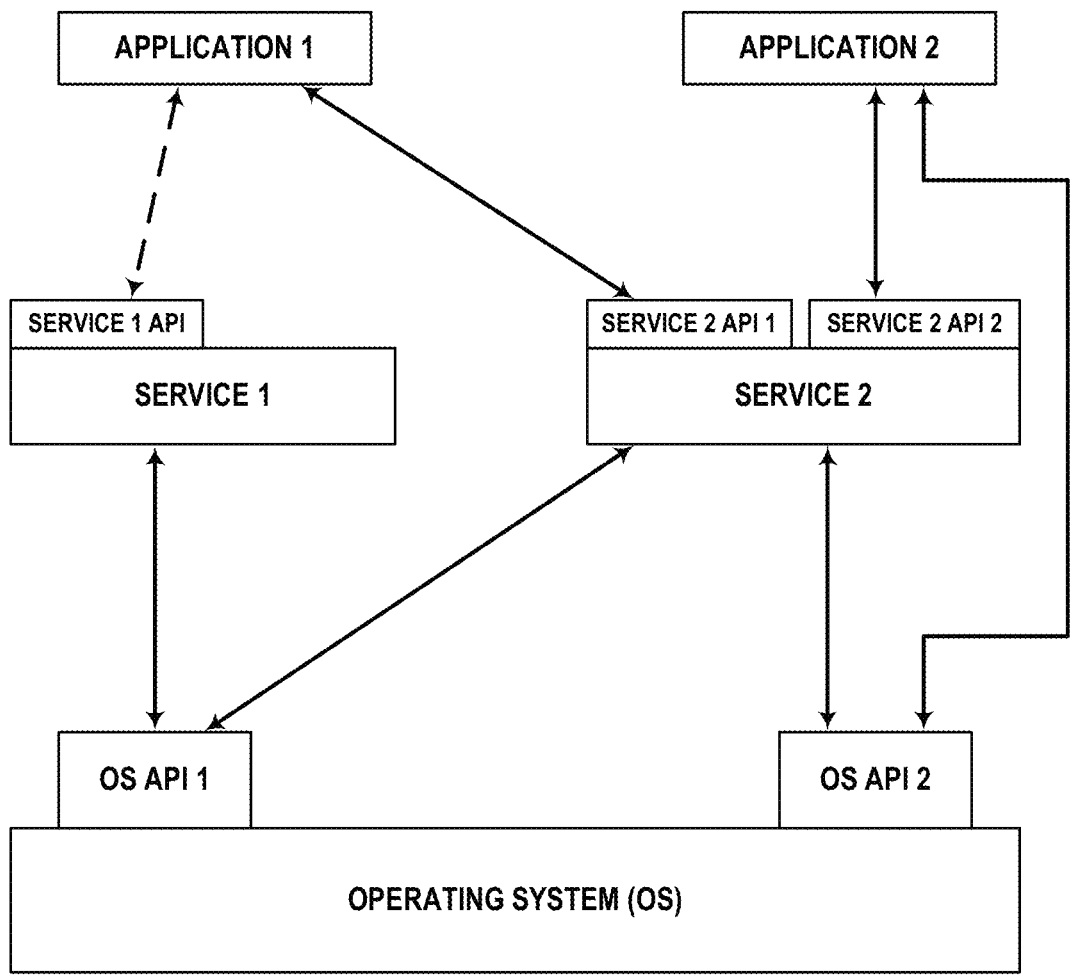
FIG. 7 illustrates an exemplary embodiment of a software stack usable in some embodiments of the invention.

In FIG. 7 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 8:
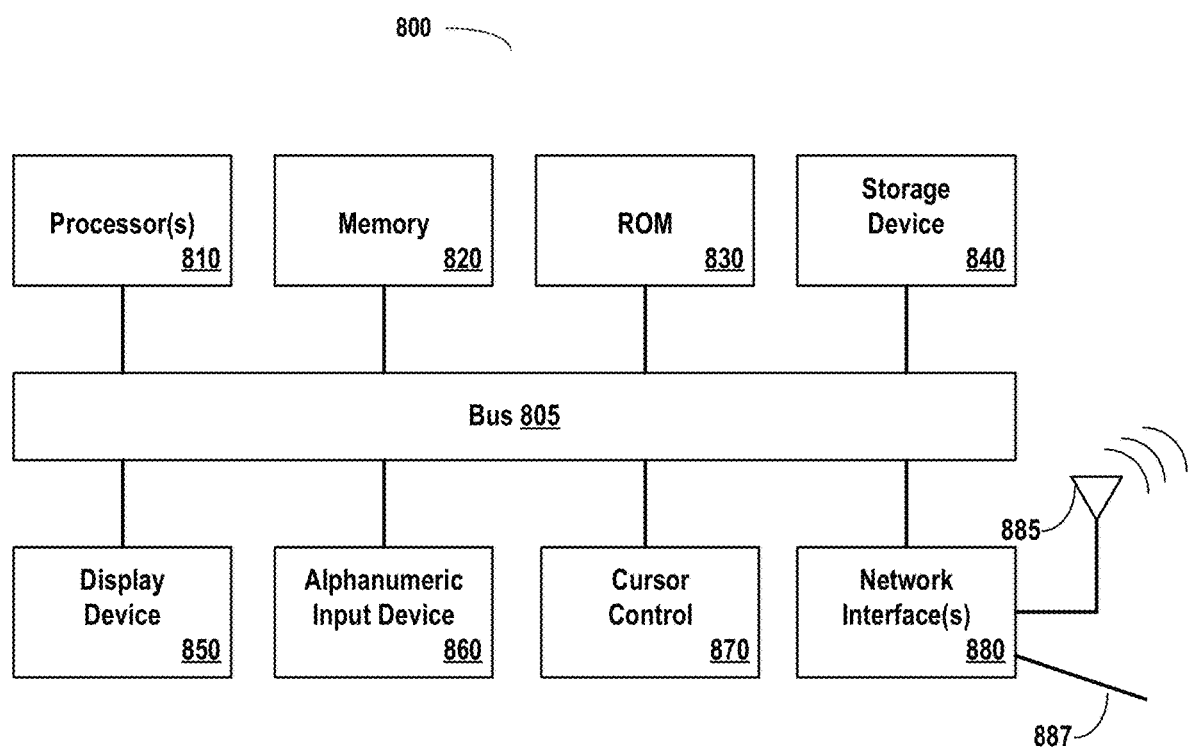
FIG. 8 is a block diagram of one embodiment of a computing system.

FIG. 8 is a block diagram of one embodiment of a computing system 800. The computing system illustrated in FIG. 8 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 8 may be used to provide the computing device and/or the server device.

Computing system 800 includes bus 805 or other communication device to communicate information, and processor 810 coupled to bus 805 that may process information.

While computing system 800 is illustrated with a single processor, computing system 800 may include multiple processors and/or co-processors 810. Computing system 800 further may include random access memory (RAM) or other dynamic storage device 820 (referred to as main memory), coupled to bus 805 and may store information and instructions that may be executed by processor(s) 810. Main memory 820 may also be used to store temporary variables or other intermediate information during execution of instructions by processor 810.

Computing system 800 may also include read only memory (ROM) and/or other static storage device 840 coupled to bus 805 that may store static information and instructions for processor(s) 810. Data storage device 840 may be coupled to bus 805 to store information and instructions. Data storage device 840 such as flash memory or a magnetic disk or optical disc and corresponding drive may be coupled to computing system 800.

Computing system 800 may also be coupled via bus 805 to display device 850, such as a cathode ray tube (CRT) or liquid crystal display (LCD), to display information to a user. Computing system 800 can also include an alphanumeric input device 860, including alphanumeric and other keys, which may be coupled to bus 805 to communicate information and command selections to processor(s) 810. Another type of user input device is cursor control 870, such as a touchpad, a mouse, a trackball, or cursor direction keys to communicate direction information and command selections to processor(s) 810 and to control cursor movement on display 850. Computing system 800 may also receive user input from a remote device that is communicatively coupled to computing system 800 via one or more network interfaces 880.

Computing system 800 further may include one or more network interface(s) 880 to provide access to a network, such as a local area network. Network interface(s) 880 may include, for example, a wireless network interface having antenna 885, which may represent one or more antenna(e). Computing system 800 can include multiple wireless network interfaces such as a combination of WiFi, Bluetooth® and cellular telephony interfaces. Network interface(s) 880 may also include, for example, a wired network interface to communicate with remote devices via network cable 887, which may be, for example, an Ethernet cable, a coaxial cable, a fiber optic cable, a serial cable, or a parallel cable.

In one embodiment, network interface(s) 880 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 880 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method, comprising:
generating a transcript of a message session between a first client device and a second client device, the transcript of the message session generated by the first client device and the transcript based on one or more encrypted messages sent by the first client device and one or more messages encrypted by the second client device received by the first client device from the second client device, wherein the message service does not decrypt the encrypted messages of the first and second client devices;
generating a plurality of keywords on the first client device, based at least in part on the transcript and at least in part on synonyms to one or more of the plurality of keywords, the synonyms obtained from an asset catalog on the first client device, the asset catalog comprising a plurality of content items, including graphical content items, at least some of the content items are not related to any of the plurality of keywords, wherein the asset catalog is periodically updated by a remote search engine with graphical content items or keywords that are trending upward in popularity based on a number of times that the graphical content items or keywords have been accessed or shared, as determined by the remote search engine, and the first client device replaces the asset catalog with the updated asset catalog;
retrieving one or more items of graphical content from the asset catalog using the plurality of keywords and the synonyms, wherein the one or more items of graphical content are filtered based upon filter criteria;
presenting at least a subset of the one or more items of filtered graphical content to a user of the first client device, based at least in part on the plurality of keywords generated from the transcript and the synonyms from the asset catalog; and
in response to the user of the first client device selecting one of the one or more items of filtered graphical content, sharing the selected item of graphical content in a message to the second client device.

2. The method of claim 1, wherein the filter criteria comprises excluding graphical content items that require a copyright license to share the graphical content items.

3. The method of claim 1, wherein the first client device does not update the asset catalog, wherein the updated asset catalog comprises at least some graphical content or keywords that the remote search engine has determined to be increasing in popularity, based upon crowd-sourced data received by the remote search engine.

4. The method of claim 3, wherein the graphical content or keywords are selected by the remote search engine for inclusion in the updated asset catalog based at least in part on the graphical content or keywords being determined to be increasing in popularity, based on the crowd-sourced data received by the remote search engine, and the first client device receives the updated asset catalog from the remote search engine.

5. The method of claim 1, wherein the filter criteria include filtering out video graphical content items that are longer than a specified length of time.

6. The method of claim 1, further comprising, in response to a user selecting a search control from a user interface of the first client device, displaying to the user a subset of the plurality of keywords.

7. The method of claim 6, further comprising:
in response to the user of the first client device selecting one or more of the displayed subset of the plurality of keywords, submitting a search request for graphical content to a search engine using the one or more selected displayed keywords and displaying one or more graphical content items, filtered in accordance with the filter criteria,
wherein at least one of the displayed graphical content items is obtained from a remote search engine.

8. The method of claim 1, wherein the transcript is kept private to the first client device, and the transcript is not transmitted to the message service.

9. A non-transitory computer readable medium programmed with instructions that, when executed by a processing system, perform operations, comprising: generating a transcript of a message session over a message service between a first client device and a second client device, the transcript of the message session generated by the first client device and the transcript based on one or more encrypted messages sent by the first client device and one or more messages encrypted by the second client device received by the first client device from the second client device, wherein the secure message service does not decrypt the encrypted messages of the first and second client devices; generating a plurality of keywords on the first client device, based at least in part on the transcript and at least in part on synonyms to one or more of the plurality of keywords, the synonyms obtained from an asset catalog on the first client device, the asset catalog comprising a plurality of content items, including graphical content items, at least some of the content items are not related to any of the plurality of keywords, wherein the asset catalog is periodically updated by a remote search engine with graphical content items or keywords are trending upward in popularity based on a number of times that the graphical content or keywords items have been accessed or shared, as determined by the remote search engine, and the first client device replaces the asset catalog with the updated catalog;
retrieving one or more items of graphical content from the asset catalog using the plurality of keywords and the synonyms, wherein the one or more items of graphical content are filtered based upon filter criteria;
presenting at least a subset of the one or more items of filtered graphical content to a user of the first client device, based at least in part on the plurality of keywords generated from the transcript and the synonyms from the asset catalog; and
in response to the user of the first client device selecting one of the one or more items of filtered graphical content, sharing the selected item of graphical content in a message to the second client device.

10. The medium of claim 9, wherein the filter criteria comprises excluding graphical content items that require a copyright license to share the graphical content items.

11. The medium of claim 9, wherein the first client device does not update the asset catalog, wherein the updated asset catalog comprises at least some graphical content or keywords that the remote search engine has determined to be increasing in popularity, based upon crowd-sourced data received by the remote search engine.

12. The medium of claim 11, wherein the graphical content or keywords are selected by the remote search engine for inclusion in the updated asset catalog based at least in part on the graphical content or keywords being determined to be increasing in popularity, based on the crowd-sourced data received by the remote search engine, and the first client device receives the updated asset catalog from the remote search engine.

13. The medium of claim 9, wherein the filter criteria include filtering out video graphical content items that are longer than a specified length of time.

14. The medium of claim 9, the operations further comprising,
in response to a user selecting a search control from a user interface of the first client device, displaying to the user a subset of the plurality of keywords.

15. The medium of claim 14, the operations further comprising:
in response to the user of the first client device selecting one or more of the displayed subset of the plurality of keywords, submitting a search request for graphical content to a search engine using the one or more selected displayed keywords and displaying one or more graphical content items, filtered in accordance with the filter criteria,
wherein at least one of the displayed graphical content items is obtained from a remote search engine.

16. A system comprising: a processing system coupled to a memory programmed with executable instructions that, when executed by the processing system perform operations, the operations comprising: generating a transcript of a message session over a message service between a first client device and a second client device, the transcript of the message session generated by the first client device and the transcript based on one or more encrypted messages sent by the first client device and one or more messages encrypted by the second client device received by the first client device from the second client device, wherein the message service does not decrypt the encrypted messages of the first and second client devices; generating a plurality of keywords on the first client device, based at least in part on the transcript and at least in part on synonyms to one or more of the plurality of keywords, the synonyms obtained from an asset catalog on the first client device, the asset catalog comprising a plurality of content items, including graphical content items, at least some of the content items are not related to any of the plurality of keywords, wherein the asset catalog is periodically updated by a remote search engine with graphical content items are trending upward in popularity based on a number of times that the graphical content items have been accessed or shared, as determined by the remote search engine; and the first client device replaces the asset catalog with the updated asset catalog;

retrieving one or more items of graphical content from the asset catalog using the plurality of keywords and synonyms, wherein the one or more items of graphical content are filtered based upon filter criteria;

presenting at least a subset of the one or more items of filtered graphical content to a user of the first client device, based at least in part on the plurality of keywords generated from the transcript and the synonyms from the asset catalog; and in response to the user of the first client device selecting one of the one or more items of filtered graphical content, sharing the selected item of graphical content in a message to the second client device.

17. The system of claim 16, wherein the filter criteria comprises excluding graphical content items that require a copyright license to share the graphical content items.

18. The system of claim 16, wherein the first client device does not update the asset catalog wherein the updated asset catalog comprises at least some graphical content or keywords that the remote search engine has determined to be increasing in popularity, based upon crowd-sourced data received by the remote search engine.

19. The system of claim 18, wherein the graphical content or keywords are selected by the remote search engine for inclusion in the updated asset catalog based at least in part on the graphical content or keywords being determined to be increasing in popularity, based on the crowd-sourced data received by the remote search engine, the first client device receives the updated asset catalog from the remote search engine.

20. The system of claim 16, wherein the filter criteria include filtering out video graphical content items that are longer than a specified length of time.

21. The system of claim 16, the operations further comprising, in response to a user selecting a search control from a user interface of the first client device, displaying to the user a subset of the plurality of keywords.

22. The system of claim 21, the operations further comprising:

in response to the user of the first client device selecting one or more of the displayed subset of the plurality of keywords, submitting a search request for graphical content to a search engine using the one or more selected displayed keywords and displaying one or more graphical content items, filtered in accordance with the filter criteria, wherein at least one of the displayed graphical content items is obtained from a remote search engine.

\* \* \* \* \*